Patented July 23, 1929.

1,721,990

UNITED STATES PATENT OFFICE.

HERMANN GAMMAY, OF STUTTGART, GERMANY.

PROCESS FOR THE PRODUCTION OF CAMPHENE FROM PINENE HYDROCHLORIDE.

No Drawing.   Application filed January 28, 1926.   Serial No. 84,511.

This invention relates to a process for the production of camphene from pinene hydrochloride. It is known to produce camphene from pinene hydrochloride by the action of alkaline compounds. By the words "alkaline compound" I mean the hydroxides and carbonates of the alkali or earth alkali metals and I shall designate these substances generically by aforesaid term in this specification and in the appended claims. In the known processes the reaction proceeds as follows:

The formation of camphene by the action of alkaline compounds upon pinene hydrochloride can be effected only incompletely for which reason in the known processes phenol is employed as converting agent in such an amount that it predominates over the alkaline compound employed. The reaction thereupon proceeds according to the following equation:

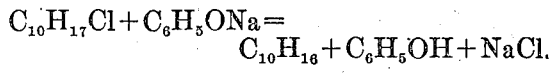

Besides phenol a great number of other substances are capable of producing this effect, i. e., to react with the pinene hydrochloride under formation of camphene principally according to the formula above. To designate all these substances generically I call them converting agents and wherever I shall use this term in this specification or in the appended claims it is with reference to this definition.

As can be seen, phenol is liberated in this reaction and the camphene will contain phenol. In order to purify the same, it must be washed with alkali lye, even if only the theoretically required amount of phenol is employed and not the excess usual in the known processes.

It has now been found that camphene free from phenol can be obtained if the reaction is carried out with smaller amounts of phenol, that is to say for example about 10% of the amount required in the above mentioned equation.

The reaction then proceeds in such a manner that the phenol liberated according to the above equation is regenerated to phenolate by the alkaline compound, which again converts a fresh amount of pinene hydrochloride until the latter has been completely converted into camphene.

In this case therefore the reaction-promoting effect of the phenol is that of a converting agent. An excess of alkaline compound is necessary but this is no disadvantage, since this excess can be re-employed after removal of the sodium chloride formed.

It has moreover been found that if the process is carried out in the above described manner, also other organic acids or their salts can be employed instead of phenol.

The following examples may be given to explain the carrying out of the new process:

(1) 2500 kgs. pinene hydrochloride are heated with 2000 kgs. caustic soda lye of 50° Bé. and 200 kgs. phenol in an autoclave at 6 to 8 atmospheres pressure, whilst stirring.

(2) 2500 kgs. pinene hydrochloride are heated with 2000 kgs. caustic soda lye of 50° Bé. and 300 kgs. α or β naphthol in an autoclave at 6 to 8 atmospheres pressure whilst stirring.

(3) 2500 kgs. pinene hydrochloride are heated with 2000 kgs. caustic soda lye of 50 Bé. and 300 kgs. sodium acetate in an autoclave at 6–8 atmospheres pressure, whilst stirring.

(4) 2500 kgs. pinene hydrochloride are heated with 2500 kgs. caustic soda lye of 50° Bé. and 300 kgs. stearic or oleic acid in an autoclave at 6 to 8 atmospheres pressure, whilst stirring.

(5) 2500 kgs. pinene hydrochloride are heated with 2500 kgs. of caustic potash lye of 50° Bé. and 300 kgs. resin acid, (colophony) in an autoclave at 6–8 atmospheres pressure, whilst stirring.

What I claim is:

1. Process for the production of camphene from pinene hydrochloride which comprises reacting on said pinene hydrochloride with a quantity of a converting agent amounting to considerably less than the stoichio-metrically equivalent quantity, and regenerating the consumed part of said converting agent by means of an alkaline compound in one continuous operation.

2. Process for the production of camphene from pinene hydrochloride which comprises reacting on said pinene hydrochloride with a quantity of a converting agent amounting to up to about 25% of the stoichiometrically equivalent quantity, and regenerating the consumed part of said converting agent by means of an alkaline compound in one continuous operation.

3. Process for the production of camphene from pinene hydrochloride which comprises reacting on said pinene hydrochloride with a quantity of a converting agent amounting to considerably less than the stoichiometrically equivalent quantity, and regenerating the consumed part of said converting agent by means of an alkaline compound in one continuous operation.

4. Process for the production of camphene from pinene hydrochloride which comprises reacting on said pinene hydrochloride with a quantity of a converting agent amounting to up to about 25% of the stoichiometrically equivalent quantity, and regenerating the consumed part of said converting agent by means of an alkaline compound in quantity amounting to more than five times the stoichiometrical equivalent of said converting agent in one continuous operation.

In testimony whereof I affix my signature.

HERMANN GAMMAY.